(12) United States Patent
Yamashita et al.

(10) Patent No.: US 10,155,998 B2
(45) Date of Patent: Dec. 18, 2018

(54) METHOD FOR RECYCLING-PROCESSING OF DUST GENERATED IN CONVERTER FURNACE, AND METHOD FOR MANUFACTURING STEEL

(71) Applicant: ASTEC IRIE CO., LTD., Kitakyushu-shi, Fukuoka (JP)

(72) Inventors: Kosuke Yamashita, Kitakyushu (JP); Nobuo Kusakabe, Kitakyushu (JP); Saburou Satou, Kitakyushu (JP); Gouta Kawamura, Kitakyushu (JP); Hiromichi Takesue, Kyoto (JP)

(73) Assignee: ASTEC IRIE CO., LTD., Kitakyushu-Shi, Fukuoka (JP)

( * ) Notice: Subject to any disclaimer, the term of this patent is extended or adjusted under 35 U.S.C. 154(b) by 114 days.

(21) Appl. No.: 15/347,645

(22) Filed: Nov. 9, 2016

(65) Prior Publication Data

US 2017/0051369 A1 Feb. 23, 2017

Related U.S. Application Data

(63) Continuation-in-part of application No. 14/911,445, filed as application No. PCT/JP2014/070897 on Aug. 7, 2014.

(30) Foreign Application Priority Data

Aug. 12, 2013 (JP) .................. 2013-167593

(51) Int. Cl.
  *C21B 5/00* (2006.01)
  *C21C 5/38* (2006.01)
  (Continued)

(52) U.S. Cl.
  CPC ................. *C21C 5/38* (2013.01); *C21B 5/00* (2013.01); *C22B 1/242* (2013.01); *C22B 7/02* (2013.01);
  (Continued)

(58) Field of Classification Search
  CPC ........... C21C 5/56; C21C 5/38; C21C 7/0037; C21B 2200/00; C21B 2100/44;
  (Continued)

(56) References Cited

U.S. PATENT DOCUMENTS 3,770,416 A * 11/1973 Goksel ................ C21B 13/0046
                                                          75/487
3,948,644 A    4/1976 Maurice et al.
(Continued)

FOREIGN PATENT DOCUMENTS

EP          2243844 A1 * 10/2010
JP        S 53133522    * 11/1978
(Continued)

OTHER PUBLICATIONS

JPS53133522 machine translation of the description. (Year: 1978).*
(Continued)

*Primary Examiner* — George Wyszomierski
*Assistant Examiner* — Tima M McGuthry-Banks
(74) *Attorney, Agent, or Firm* — Procopio, Cory, Hargreaves & Savitch LLP (57) ABSTRACT

A method for recycling processing of dust generated in a converter furnace, includes: crushing and drying a cake formed by adding a binder to a slurry containing iron powder-containing dust that is generated at the time of converter blowing and wet-collected to produce a mixed slurry and subjecting the produced mixed slurry to a dehydration treatment in a filter press; accumulating the cake in an accumulation tank; and charging the cake into a converter furnace 10, the crushed product in the accumulation tank 25 is kept at a temperature of less than 90° C. by forcibly passing air into the accumulation tank 25 and charged into a converter furnace according to the converter operation.

23 Claims, 4 Drawing Sheets

(51) Int. Cl.
    *C21C 5/56*     (2006.01)
    *C21C 7/00*     (2006.01)
    *C22B 7/02*     (2006.01)
    *C22B 1/242*    (2006.01)
    *C21C 7/068*    (2006.01)

(52) U.S. Cl.
    CPC ...... *C21B 2100/00* (2013.01); *C21B 2200/00* (2013.01); *C21C 5/56* (2013.01); *C21C 7/0037* (2013.01); *C21C 7/068* (2013.01); *C21C 2200/00* (2013.01); *Y02P 10/216* (2015.11)

(58) Field of Classification Search
    CPC ..... C21B 2100/00; C21B 5/00; C22B 7/0037; C22B 1/242; C22B 7/02
    See application file for complete search history.

(56) References Cited

U.S. PATENT DOCUMENTS

| | | | | |
|---|---|---|---|---|
| 4,134,755 A | * | 1/1979 | Maeda | B03B 9/04 |
| | | | | 75/769 |
| 4,199,349 A | * | 4/1980 | Wood | C21B 5/008 |
| | | | | 75/430 |
| 5,423,900 A | | 6/1995 | Klintworth et al. | |
| 6,007,601 A | * | 12/1999 | Lynn | C02F 11/122 |
| | | | | 75/773 |

FOREIGN PATENT DOCUMENTS

| | | |
|---|---|---|
| JP | H07-316622 | 12/1995 |
| JP | 2004-010985 | 1/2004 |
| JP | 3712944 | 11/2005 |
| WO | 2008032638 A1 | 3/2008 |

OTHER PUBLICATIONS

Patent family document and machine translation of the description for WO 2008/032638. (Year: 2008).*
Full human translation of JP 53-133522 (published Nov. 21, 1978) from LinguaLinx Language Solutions.*
Non Final Office Action for U.S. Appl. No. 14/911,445, dated Dec. 7, 2017, 9 pgs.
Kelebek, S. et al., Characterization of basic oxygen furnace dust and zinc removal by acid leaching, Minerals Engineering, Feb. 2004, 17(2), pp. 285-291.
International Search Report for PCT/JP2014/070897 dated Oct. 21, 2014, 2 pgs.

* cited by examiner

METHOD FOR RECYCLING-PROCESSING OF DUST GENERATED IN CONVERTER FURNACE, AND METHOD FOR MANUFACTURING STEEL

CROSS-REFERENCE TO RELATED APPLICATION

This is a continuation-in-part of application Ser. No. 14/911,445, filed on Feb. 10, 2016, which is a US national stage entry of International Application No. PCT/JP2014/070897, filed on Aug. 7, 2014, and claims priority from Japanese Patent Application No. 2013-167593 filed on Aug. 12, 2013, the contents of which are incorporated herein by reference in their entirety.

TECHNICAL FIELD

The present invention relates to a method for recycling processing of dust generated in a converter furnace for returning iron powder-containing dust generated at the time of converter blowing to the converter process, in manufacturing a molten steel obtained by decarburizing molten iron in the converter furnace, which is produced in a blast furnace and through a pretreatment processing as needed. The present invention also relates to a method for manufacturing steel.

BACKGROUND ART

Conventionally, iron powder-containing dust generated at the time of converter blowing is wet-collected, then separated by a coarse particle separator into, for example, iron powder-containing dust having a particle diameter of 60 μm or more and iron powder-containing dust having a particle diameter of less than 60 μm, and collected. The iron powder-containing dust having a particle diameter of less than 60 μm is formed into briquette and reused as a cooling agent or an iron source in the converter process. Specifically, the briquette of the iron powder-containing dust is charged into a converter furnace together with molten iron which is produced in a blast furnace and subjected to a pretreatment processing such as desulfurization and dephosphorization, as needed. The molten iron is decarburized to produce molten steel. The molten steel is solidified in continuous casting equipment and then subjected to a processing such as rolling or forging to produce a steel material. In the converter process, from the standpoint of obtaining a function as a cooling agent and preventing spontaneous combustion during stock of the briquette, the metallic iron content of iron powder-containing dust forming the briquette is regulated to 10 mass % or less. Therefore, there is a problem that despite iron powder-containing dust originally having a high metallic iron content, the dust recycled to the converter process is not effectively utilized as a metallic iron resource.

To solve this problem, Patent Document 1 discloses a method for recycling processing of dust generated in a converter furnace, where a low cost and a short processing time are realized and the yield in the converter process can be increased by recycling iron powder-containing dust as metallic iron to a converter furnace. In this recycling processing method, the minimum particle diameter (separation particle diameter) of iron powder-containing dust removed by a coarse particle separator is, for example, 60 μm, and a cake having a size of length of 1,200 mm, width of 1,200 mm and thickness of about 30 mm is produced using the remaining iron powder-containing dust (less than 60 μm), dried to reduce the water content of the cake to 10% or less, and temporarily stored at a scrap yard provided in the vicinity of a converter shop, where according to the converter operation, the cake during storage is charged into a high-temperature converter through a scarp shoot. Here, when a cake containing water component is charged into a converter furnace, the water component in the cake evaporates in a short time and if the water content of the cake is high, the cake undergoes steam explosion, as a result, the cake cannot be charged into a converter furnace. However, when the water content of the cake is 10% or less, the cake can be charged into a converter furnace. On the other hand, the iron powder-containing dust of 60 μm or more removed by a coarse particle separator is dried and thereafter, directly charged into a converter furnace by using a scrap shoot.

RELATED ART

Patent Document

Patent Document 1: Japanese Patent No. 3712944

SUMMARY OF THE INVENTION

Problems that the Invention is to Solve

In the case where a large cake formed of iron powder-containing dust is charged into a converter furnace through a scrap shoot, there is a problem that part of iron oxide in the cake (resulting from oxidation of metallic iron in the iron powder-containing dust during recycling processing and during temporary storage at a scrap yard) reacts with carbon in molten iron supplied to the converter and produces carbon monoxide and the produced carbon monoxide further reacts with oxygen in air at the throat of the converter, involving the generation of a flame. In addition, in the case where iron powder-containing dust having a particle diameter of 60 μm or more is directly charged into a converter furnace, part of metallic iron in the iron powder-containing dust reacts with oxygen in air during a period from its charging to charging of molten iron into the furnace in a high-temperature atmosphere, leaving a problem of flame generation and a problem that the dust is not effectively utilized as a metallic iron resource.

The present invention has been made under these circumstances, and an object of the present invention is to provide a method for recycling processing of dust generated in a converter furnace, where iron powder-containing dust generated at the time of converter blowing can be collected at a low cost in a short time and returned as a metallic iron resource to the converter process. Another object of the present invention is to provide a method for manufacturing steel in which the iron powder-containing dust is recycled according to the method for recycling process.

Means for Solving the Problems

In order to achieve the above object, a method for recycling processing of dust generated in a converter furnace according to an aspect of the present invention, includes: crushing and drying a cake; accumulating the cake in an accumulation tank; and charging the cake into a converter furnace, the cake being formed by adding a binder to a slurry containing iron powder-containing dust that is generated at the time of converter blowing and wet-collected to produce a mixed slurry and subjecting the produced mixed slurry to a dehydration treatment in a filter press, and the method includes forcibly passing air into the accumulation tank to keep a crushed product in the accumulation tank at a temperature of less than 90° C., and charging the crushed product into a converter furnace according to a converter operation.

The metallic iron in the crushed product is oxidized by oxygen in air and due to the heat of reaction at the time, the temperature of the crushed product is higher than ordinary temperature. Here, when water component is present in the crushed product, the heat generated by oxidation of metallic iron is consumed as vaporization heat at the time of evaporation of water, and the temperature of the crushed product is kept constant. More specifically, when water is present in the crushed product and the temperature of the crushed product does not exceed the boiling point of water (usually, 100° C.), spontaneous combustion of the crushed product does not occur, but when the temperature of the crushed product exceed, for example, 80° C., the water component in the crushed product rapidly evaporates. After the water component is substantially eliminated from the crushed product, the temperature of the crushed product is caused to rise due to the heat of reaction, and the hardness of the crushed product increases, but an oxidation reaction also proceeds, and the proportion of metallic iron is reduced. For this reason, the temperature of the crushed product is preferably kept at less than 80° C., more preferably at less than 60° C.

In the method for recycling processing of dust generated in a converter furnace according to an aspect of the present invention, it is preferable that the slurry includes iron powder-containing dust B as a remainder after separating iron powder-containing dust A exceeding a set separation particle diameter from the wet-collected iron powder-containing dust. Further, the separation particle diameter may be set to a range of 60 to 500 µm.

In the method for recycling processing of dust generated in a converter furnace according to an aspect of the present invention, it is preferable that quick lime is added as the binder in an amount of 3 to 15% relative to a weight of the iron powder-containing dust B in said slurry.

In the method for recycling processing of dust generated in a converter furnace according to an aspect of the present invention, cement may be added as the binder in an amount of 15 to 20% relative to a weight of the iron powder-containing dust B in said slurry.

In the method for recycling processing of dust generated in a converter furnace according to an aspect of the present invention, it is preferable that the slurry has a specific gravity of 1.2 to 1.35 and a viscosity of 0.2 to 1 dPa·s.

In the method for recycling processing of dust generated in a converter furnace according to an aspect of the present invention, the method may further include producing molten iron in a blast furnace; charging the molten iron into the converter furnace with the crushed product; and decarburizing the molten iron in the converter furnace to produce steel. In this case, it is more preferable that cement is added as the binder in an amount to 15 to 20% relative to a weight of the iron powder-containing dust B in the slurry. It is still more preferable that the method further includes reducing a sulfur content in the molten iron to 0.006% or less relative to a weight of the molten iron before the molten iron is charged into the converter furnace with the crushed product.

According to an aspect of the present invention, a method for manufacturing steel, includes: producing molten iron in a blast furnace; charging the molten iron into a converter furnace with iron powder-containing dust generated at the time of converter blowing and subjected to a recycling processing; and decarburizing the molten iron in the converter furnace to produce steel. The recycling processing includes: crushing and drying a cake; accumulating the cake in an accumulation tank; and charging the cake into the converter furnace, the cake being formed by adding a binder to a slurry containing the iron powder-containing dust that is generated at the time of converter blowing and wet-collected to produce a mixed slurry and subjecting the produced mixed slurry to a dehydration treatment in a filter press. The recycling processing further includes forcibly passing air into the accumulation tank to keep a crushed product in the accumulation tank at a temperature of less than 90° C., and charging the crushed product into the converter furnace according to a converter operation.

In the method for manufacturing steel according to an aspect of the present invention, it is preferable that the slurry includes iron powder-containing dust B as a remainder after separating iron powder-containing dust A exceeding a set separation particle diameter from the wet-collected iron powder-containing dust. Further, the separation particle diameter may be set to a range of 60 to 500 µm.

In the method for manufacturing steel according to an aspect of the present invention, it is preferable that quick lime is added as the binder in an amount of 3 to 15% relative to a weight of the iron powder-containing dust B in said slurry.

In the method for manufacturing steel according to an aspect of the present invention, it is preferable that cement is added as the binder in an amount of 15 to 20% relative to a weight of the iron powder-containing dust B in said slurry. In this case, it is further preferable that the method further includes reducing a sulfur content in the molten iron to 0.006% or less relative to a weight of the molten iron before the molten iron is charged into the converter furnace with the crushed product.

In the method for manufacturing steel according to an aspect of the present invention, it is preferable that the slurry has a specific gravity of 1.2 to 1.35 and a viscosity of 0.2 to 1 dPa·s.

Advantage of the Invention

In the method for recycling processing of dust generated in a converter furnace according to an aspect of the present invention and in the method for manufacturing steel according to another aspect of the present invention, a mixed slurry is produced by adding a binder to a slurry containing wet-collected iron powder-containing dust, and a crushed product of a cake formed by dehydrating the mixed slurry by a filter press is dried, so that the strength of the crushed product after drying can be increased and the powdering ratio at the time of transportation and storage of the crushed product in an accumulation tank can be reduced to facilitate the recycling to a converter furnace. In addition, the crushed product in the accumulation tank is kept at a temperature of less than 90° C. (preferably less than 80° C., more preferably less than 60° C.) by forcibly passing air into the accumulation tank, so that the progress of oxidation of metallic iron in the crushed product can be suppressed and the metallic iron content in the crushed product can be maintained high by preventing spontaneous combustion of the crushed product. As a result, the iron powder-containing dust can be effectively utilized as a metallic iron resource.

In the method for recycling processing of dust generated in a converter furnace according to an aspect of the present invention and in the method for manufacturing steel according to another aspect of the present invention, in the case where the slurry contains iron powder-containing dust B as the remainder after separating iron powder-containing dust A exceeding a set separation particle diameter from the wet-collected iron powder-containing dust, the particle size configuration of the iron powder-containing dust B can be changed by selecting the separation particle diameter, so that the filling factor of a cake formed by subjecting the mixed slurry to a dehydration treatment in a filter press can be enhanced and the initial water content at the time of formation of a cake can be reduced. As a result, the water content of the cake can be easily decreased by drying (for example, to 10% or less).

In the method for recycling processing of dust generated in a converter furnace according to an aspect of the present invention and in the method for manufacturing steel according to another aspect of the present invention, in the case where the separation particle diameter is set to a range of 60 to 500 μm, the ratio of iron powder-containing dust B relative to the wet-collected iron powder-containing dust (the utilization ratio of iron powder-containing dust) can be increased (for example, to 70% or more), and the load in processing the iron powder-containing dust A not used for the formation of a cake can be reduced.

Here, when the separation particle diameter is set, for example, to a range of 150 to 500 μm, the content of metallic iron contained in the iron powder-containing dust B is increased, making it possible to further effectively utilize the iron powder-containing dust as a metallic iron resource, and the filling factor of a cake is increased to reduce the water content of the cake, whereby the drying time and drying cost of the crushed product can be reduced and the collection of the iron powder-containing dust is facilitated.

In the method for recycling processing of dust generated in a converter furnace according to an aspect of the present invention and in the method for manufacturing steel according to another aspect of the present invention, in the case where quick lime is added as the binder in an amount of 3 to 15% relative to the weight of the iron powder-containing dust B in the slurry, the amount added is remarkably small compared with other binders such as cement, so that the binder cost can be greatly saved and the time required for solidification of the crushed product (curing period) can also be greatly shortened. Thus, the crushed product can be produced at a low cost and a high efficiency.

From the standpoint of availability, cement may be used as a binder instead of quick lime. The cement may be used in an amount of 15 to 20% relative to the weight of the iron powder-containing dust B in the slurry. In such a case, the molten iron, before being charged into the converter furnace with the crushed product, may be subjected to desulfurization as a pretreatment processing so that the content of sulfur is 0.006% or less relative to the weight of the molten iron.

In the method for recycling processing of dust generated in a converter furnace according to an aspect of the present invention and in the method for manufacturing steel according to another aspect of the present invention, in the case where the slurry has a specific gravity of 1.2 to 1.35 and a viscosity of 0.2 to 1 dPa·s, the productivity of a cake by a filter press can be enhanced, and the water content of the obtained cake can be reduced.

EMBODIMENTS FOR CARRYING OUT THE INVENTION

Embodiments for carrying out the present invention is described below by referring to the drawings attached, thereby facilitating an understanding of the present invention.

Figure 1:
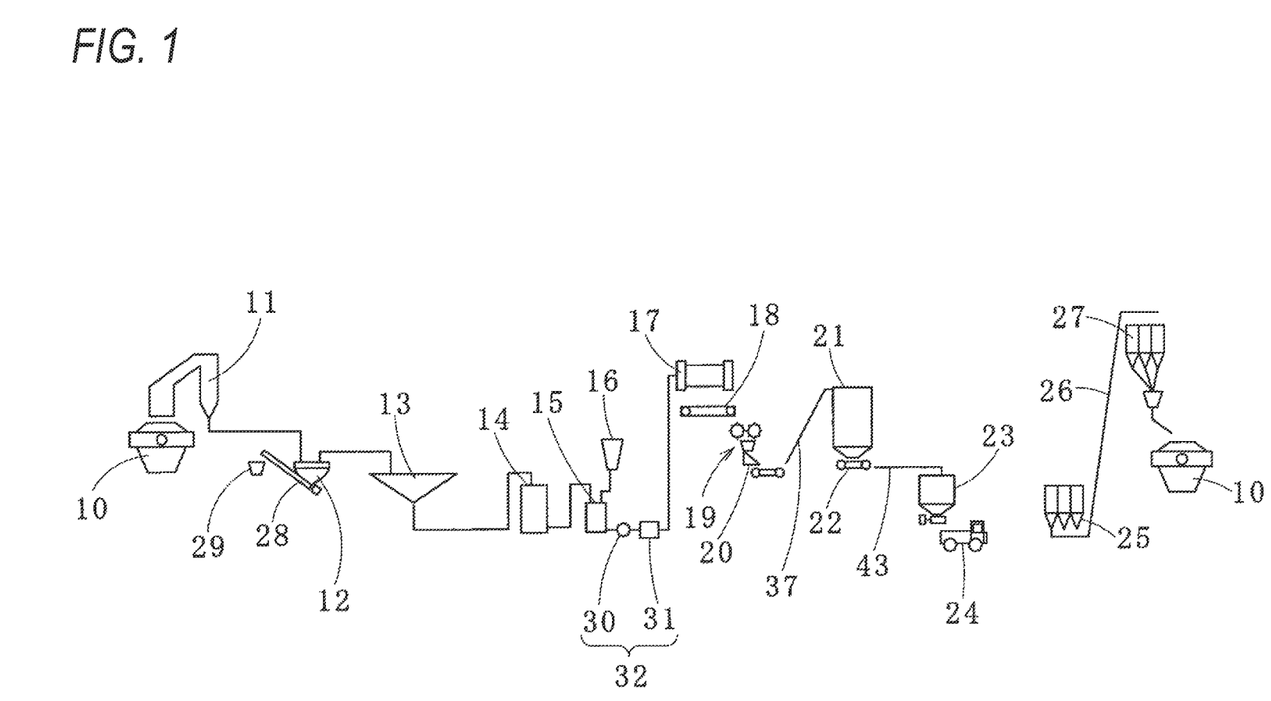
FIG. 1 is an explanatory view of a method for recycling processing of dust generated in a converter furnace according to one embodiment of the present invention.

The method for recycling processing of dust generated in a converter furnace according to one embodiment of the present invention, illustrated in FIG. 1, is a method for recycling processing of dust generated in a converter furnace, including crushing and drying a cake, accumulating the cake in a accumulation tank, and charging it into a converter furnace, the cake being formed by adding a binder to a slurry containing iron powder-containing dust that is generated at the time of blowing to molten iron in the converter furnace, produced in a blast furnace and subjected to a pretreatment processing as needed, and that is wet-collected, and subjecting the produced mixed slurry to a dehydration treatment in a filter press, wherein the crushed product in the accumulation tank is kept at a temperature of less than 90° C. by forcibly passing air into the accumulation tank and charged into a converter furnace according to the converter operation. Detailed explanations are described below.

As illustrated in FIG. 1, the method for recycling processing of dust generated in a converter furnace includes a first step of wet-collecting iron powder-containing dust generated in a converter furnace 10 at the time of converter blowing by using a wet dust collector 11; a second step of supplying the wet-collected iron powder-containing dust to a coarse particle separator 12 set to a separation particle diameter of, e.g., from 60 to 500 μm for separating iron powder-containing dust A having a particle diameter exceeding the separation particle diameter and allowing iron powder-containing dust B having a particle diameter not more than the separation particle diameter to be collected, conveyed to a precipitation tank 13 and after forming an aggregate by adding a settling accelerator, conveyed and accumulated in a stock tank 14; and a third step of conveying an aggregate taken out from the stock tank 14 to a mixing tank 15 in which quick lime (an example of the binder) stocked in a binder stock tank 16 is added and mixed to prepare a slurry.

Here, the dust that is wet-collected in the first step is generated when molten iron is subjected to blowing in the converter furnace. The molten iron is produced in a blast furnace and charged into the converter furnace with the crushed product obtained in the recycling processing, as explained below. The molten iron is subjected to a pretreatment processing such as desulfurization and dephosphodzation as needed before being charged into the converter furnace. In the converter furnace, the molten iron is subjected to decarburization to produce steel.

In addition, the recycling processing step includes a fourth step of supplying the slurry taken out from the mixing tank 15 to a filter press 17 to form a plate-like cake by compression, and a fifth step of discharging the cake to a belt conveyer 18 arranged below the filter press 17, followed by conveyance to a crusher 19 and sizing to a preset size to produce a crushed product.

Furthermore, the recycling processing step includes a sixth step of classifying the crushed product by a set classification size by using a classifier 20 for allowing a crushed product having a size not less than the classification size to be recovered, supplied to a drying hopper 21 and dried and conveying the crushed product after drying to a delivery vessel 23 through a belt feeder 22, and a seventh step of conveying the crushed product taken out from the delivery vessel 23 to an underground bunker 25 of a converter shop, as one example of the accumulation tank, by using a truck 24 as one example of the transportation means, for accumulating it. According to the converter operation, the crushed product accumulated in the underground bunker 25 is conveyed to an on-furnace bunker 27 in the converter shop by using a belt conveyer 26 and charged into a converter furnace. Each step is described below.

First Step

The iron powder-containing dust generated at the time of converter 10 blowing is suctioned by a suction blower (not shown) together with a large amount of reaction gas from a exhaust port arranged at the furnace top of the converter 10 and flows into a wet dust collector 11. In the wet dust collector 11, a large amount of water is sprayed, and the iron powder-containing dust is trapped by water and separated from the reaction gas. The iron powder-containing dust trapped by water is wet-collected as dust-collecting water. On the other hand, the reaction gas is collected by a suction blower and sent to a gas holder (not shown).

Second Step

Figure 2:
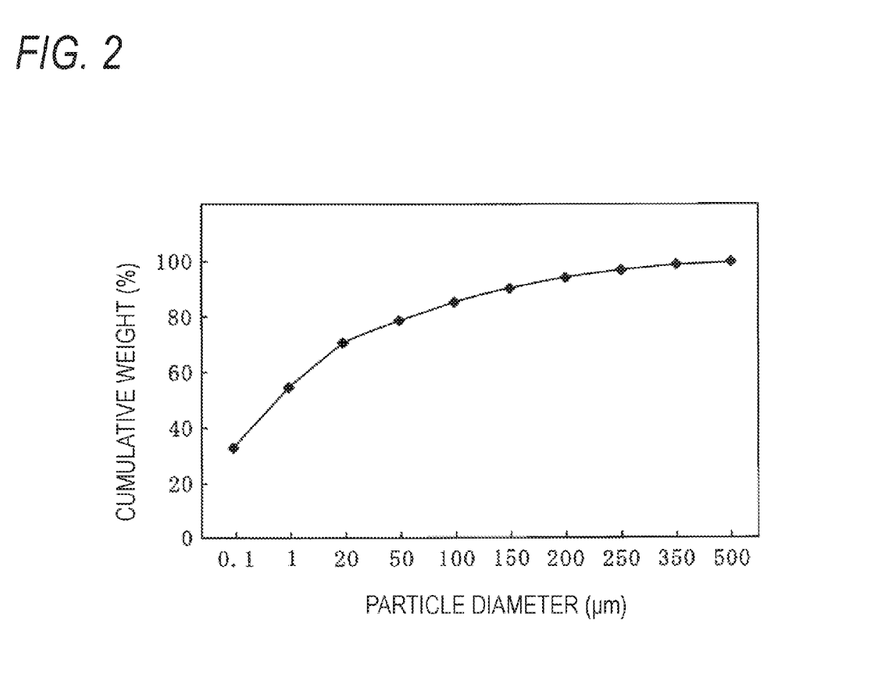
FIG. 2 is a graph of the cumulative weight distribution for explaining the particle size configuration of the wet-collected iron powder-containing dust.
Figure 3:
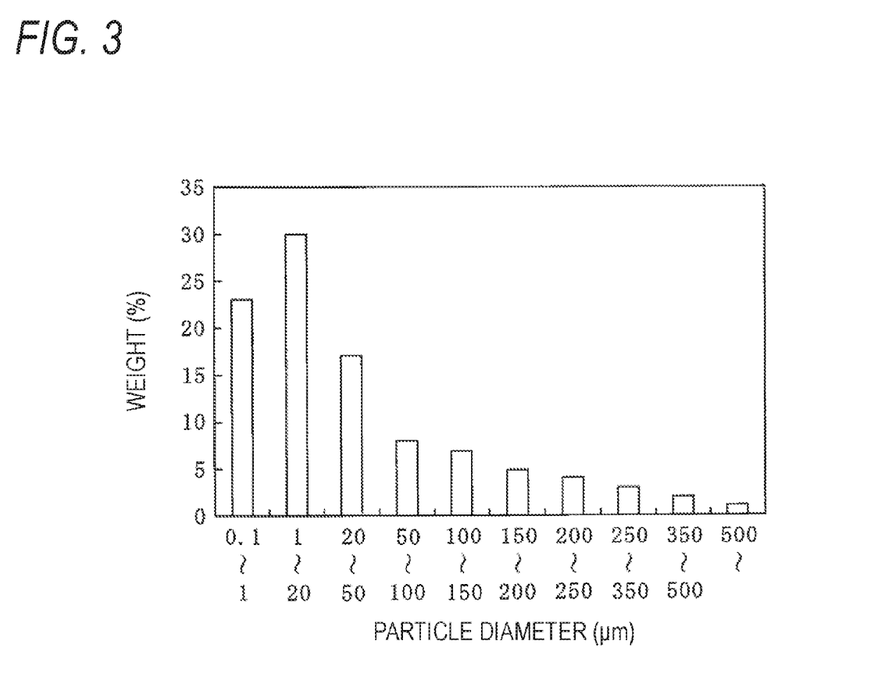
FIG. 3 is a graph of the frequency distribution for explaining the particle size configuration of the wet-collected iron powder-containing dust.

From the iron powder-containing dust in the dust-collecting water (the wet-collected iron powder-containing dust), iron powder-containing dust A having a particle diameter exceeding the separation particle diameter is separated by settling by using a coarse particle separator 12 set to a separation particle diameter of preferably from 60 to 500 μm, more preferably from 150 to 500 μm. FIG. 2 shows a graph of the cumulative weight distribution for explaining the particle size configuration of the wet-collected iron powder-containing dust, and FIG. 3 shows a graph of the frequency distribution for explaining the particle size configuration of the wet-collected iron powder-containing dust. Accordingly, when the separation particle diameter is set to 500 μm, the proportion of iron powder-containing dust B is about 99% of the wet-collected iron powder-containing dust and in turn, the proportion of iron powder-containing dust A is less than 1% of the wet-collected iron powder-containing dust, so that the load in processing the iron powder-containing dust A can be greatly reduced.

It is also seen from FIG. 2 that when the separation particle diameter is set to 350 μm, about 97% of the wet-collected iron powder-containing dust can be utilized; when the separation particle diameter is set to 250 μm, about 94% of the wet-collected iron powder-containing dust can be utilized; when the separation particle diameter is set to 200 μm, about 90% of the wet-collected iron powder-containing dust can be utilized; when the separation particle diameter is set to 150 μm, about 85% of the wet-collected iron powder-containing dust can be utilized; when the separation particle diameter is set to 100 μm, about 78% of the wet-collected iron powder-containing dust can be utilized; when the separation particle diameter is set to 60 μm, about 73% of the wet-collected iron powder-containing dust can be utilized; and when the separation particle diameter is set to 50 about 70% of the wet-collected iron powder-containing dust can be utilized. Therefore, in order to increase the utilization ratio of the wet-collected iron powder-containing dust, for example, to achieve a utilization ratio of more than 70%, the separation particle diameter of the course particle separator 12 is preferably set to a range of 60 to 500 μm.

The separated iron powder-containing dust A is conveyed to a collection tank 29 through a screw feeder 28 as one example of the conveying means. On the other hand, the iron powder-containing dust B having a particle diameter of not more than the separation particle diameter is conveyed as a supernatant water to the precipitation tank 13. A predetermined amount of a settling accelerator (for example, an inorganic coagulant such as aluminum sulfate and ferric chloride, or a polymer flocculant such as anion polymer) is added to the precipitation tank 13, and iron powder-containing dust B is aggregated to form an aggregate in the precipitation tank 13. The formed aggregate is conveyed as a slurry together with water to the stock tank 14 by means of a supply pump (not shown) and accumulated. In the stock tank 14, stirring means e.g. stirring blade) (not shown) is provided, and settling of the iron powder-containing dust B is thereby prevented.

Third Step

The slurry in the stock tank 14 is conveyed only in a predetermined amount to the mixing tank 15 by using a supply pump (not shown). In the mixing tank 15, a predetermined amount (from 3 to 15% relative to the weight of the iron powder-containing dust B contained in the slurry conveyed to the mixing tank 15) of quick lime is supplied from the binder stock tank 16 and mixed. The quick lime supplied to the mixing tank 15 is changed to calcium hydroxide by the reaction with water and uniformly dispersed in water to form a mixed slurry.

From the standpoint of availability, cement may be used as a binder instead of quick lime. The cement may be used in an amount of 15 to 20% relative to the weight of the iron powder-containing dust B in the slurry. Cement is uniformly dispersed in water to form a mixed slurry.

The specific gravity of the slurry and the viscosity of the slurry are preferably adjusted to a range of 1.2 to 1.35 and a range of 0.2 to 1 dPa·s, respectively. Here, the fluctuation of specific gravity of the slurry is affected by the specific gravity of an aggregate formed after the iron powder-containing dust B in the supernatant water of the coarse particle separator 12 is aggregated in the precipitation tank 13 over a long period of time, and therefore, is affected by the time from entering of supernatant water in the precipitation tank 13 until discharge as an aggregate. Accordingly, for example, when the specific gravity of the slurry is measured every 8 hours and the discharge rate of the aggregate is controlled to maintain the specific gravity, an optimal specific gravity of the slurry can be obtained. On the other hand, the viscosity of the slurry is affected by slurry components, etc. determined depending on the operation conditions of the converter, in addition to the specific gravity. But unlike the specific gravity, the slurry components do not fluctuate largely and therefore, the viscosity value of the slurry is returned to a control range by continuously measuring the viscosity of the slurry and, for example, adjusting the specific gravity of the slurry when the change in the viscosity value reaches a non-negligible level.

Fourth Step

The mixed slurry in the mixing tank 15 is supplied to each filter chamber partitioned by a filter plate of the filter press 17 through mixed slurry supply means 32 equipped with a suction pump 30 and a high-pressure forcing pump 31 arranged on the downstream side of the suction pump 30, and compressed to form a plate-like cake having, for example, a length of 1,100 mm, a width of 1,100 mm and a thickness of 30 mm and being shape-retentive. The suction pump 30 is a pump for supplying the mixed slurry to the filter press 17 in the initial stage of starting of compression, for example, over 10 minutes from the start of compression, and the supply pressure is, for example, about 1 MPa. On the other hand, the high-pressure forcing pump 31 is a pump for supplying the mixed slurry to the filter press 17 over a period from the stage where 10 minutes is passed from the start of compression, until the point where the compression is completed, and the supply pressure is, for example, about 10 MPa.

In the case of forming a cake in the filter press 17, if the specific gravity of the slurry is less than 1.2, since the concentration of the solid matter (iron powder-containing dust B) in the mixed slurry is low, the forcing time at the final stage of compression is prolonged, and the compression terminates without reaching a last point that is ideal in terms of efficiency. In turn, the water content of the cake formed in the filter chamber is high. On the other hand, if the specific gravity of the slurry exceeds 1.35, variation in the resistance pressure loss) at the time of passing of the mixed slurry through a mixed slurry inflow passage that is present in each cake and narrowed, becomes large in the final stage of compression, and a difference is produced in the pressing force when pressing both sides of a filter plate between adjacent filter chambers. Then, the filter plate is pushed from the larger pressing force side and deforms toward the smaller pressing force side to decrease the volume of the filter chamber on the smaller pressing force side, and the filter chamber decreased in the volume does not allow for inflow of the mixed slurry any more, resulting in no rise of the pressure of the mixed slurry and no progress of the compression (that is, the compression of a cake in the filter chamber decreased in the volume due to deformation of the filter plate terminates at an early stage). Therefore, a large water content variation is caused among respective cakes, and the incidence of a cake with water content abnormality, i.e., a water content of 20% or more, as well as the average water content are increased. For this reason, the lower limit value and the upper limit value of the specific gravity of the slurry are preferably 1.2 and 1.35, respectively.

Figure 4A:
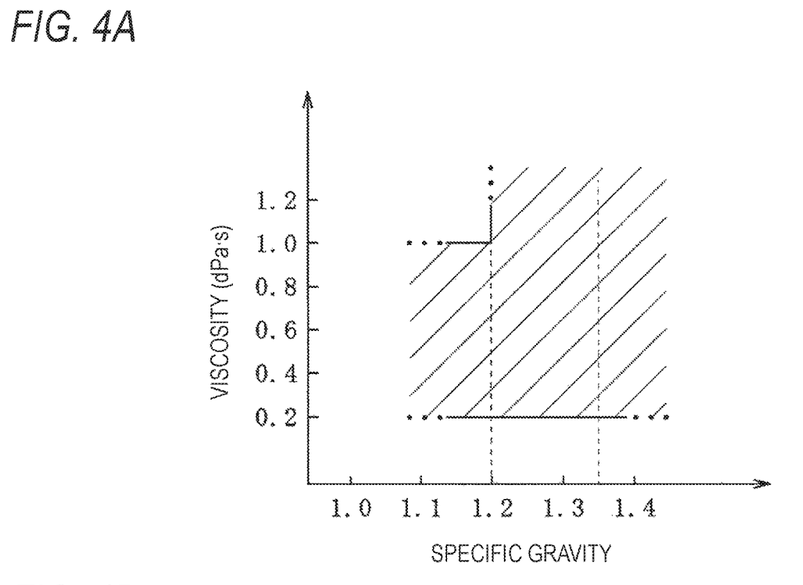
FIG. 4A is an explanatory view illustrating the existence region of a slurry by taking a specific gravity and a viscosity as parameters.
Figure 4B:
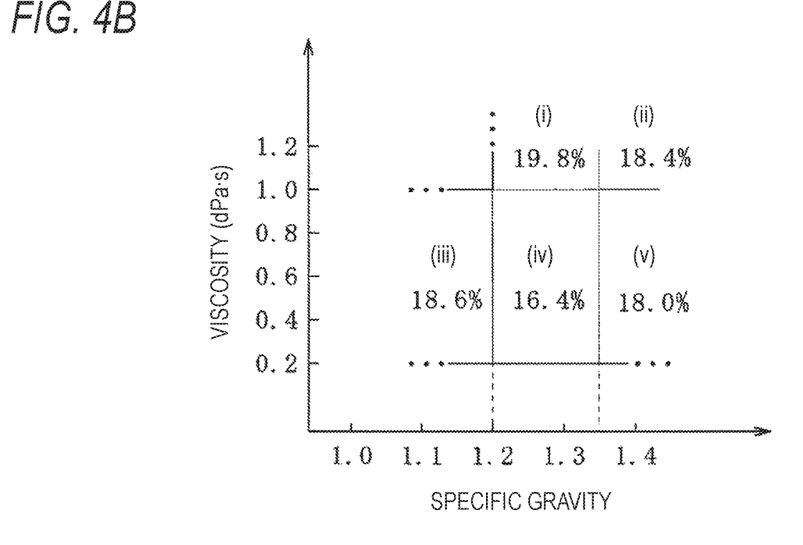
FIG. 4B is an explanatory view illustrating the relationship between the existence region of a slurry and the water content of a cake produced from the slurry in the existence region.

As verified by the actual measurement of the viscosity of the slurry conveyed to the stock tank 14, the viscosity of the slurry does not become less than 0.2 dPa·s. In addition, in a slurry where the specific gravity of the slurry is adjusted to less than 1.2, since the specific gravity is small (the content of iron powder-containing dust B is small), the viscosity of the slurry does not exceed 1 dPa·s. Accordingly, the slurry existence region on a specific gravity-slurry plane, depicted by taking the specific gravity of the slurry on the horizontal axis and the viscosity of the slurry on the vertical axis, is as shown in FIG. 4A. Here, when the lower and upper limit values of the specific gravity of the slurry, the empirical lower limit value (0.2 dPa·s) of the viscosity of the slurry, and the empirical upper limit value (1 dPa·s) of the viscosity of a low-specific-gravity slurry with a specific gravity of less than 1.2 are assigned to the border values, the slurry existence region consists of, as shown in FIG. 4B, a section (i) region where the specific gravity is from 1.2 to 1.35 and the viscosity is more than 1 dPa·s, a section (ii) region where the specific gravity is more than 1.35 and the viscosity is more than 1 dPa·s, a section (iii) region where the specific gravity is less than 1.2 and the viscosity is from 0.2 to 1 dPa·s, a section (iv) region where the specific gravity is from 1.2 to 1.35 and the viscosity is from 0.2 to 1 dPa·s, and a section (v) region where the specific gravity is more than 1.35 and the viscosity is from 0.2 to 1 dPa·s.

Then, cakes are produced using a plurality of slurries existing in the section (i) region to the section (v) region, respectively, and determined for the water content, as a result, the average water content of the cake formed of the slurry in the section (i) region is 19.8%, the average water content of the cake formed of the slurry in the section (ii) region is 18.4%, the average water content of the cake formed of the slurry in the section (iii) region is 18.6%, the average water content of the cake formed of the slurry in the section (iv) region is 16.4%, and the average water content of the cake formed of the slurry in the section (v) region is 18.0%, revealing that the average water content of the cake formed of the slurry in the section (iv) region is lowest. It is understood therefrom that in order to form a cake with a low water content by using a slurry adjusted to a specific gravity of 1.2 to 1.35, the viscosity of the slurry is preferably adjusted to a range of 0.2 to 1 dPa·s.

Figure 5:
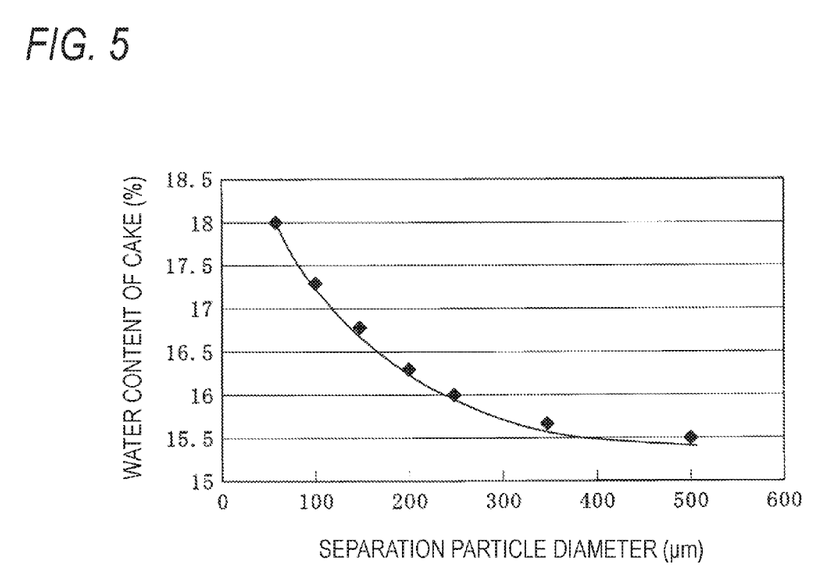
FIG. 5 is a graph illustrating the relationship between the separation particle diameter set when collecting iron powder-containing dust B, and the water content of the cake formed.

For example, in the case where a mixed slurry is produced from a slurry prepared to have a specific gravity of 1.2 to 1.35 and a viscosity of about 0.6 dPa·s by using iron powder-containing dust B collected while setting the separation particle diameter of the coarse particle separator 12 to 500, 350, 250, 200, 150, 100 and 60 µm and a cake is formed using a filter press, the water content of the cake is from 14.5 to 16.5% when the separation particle diameter is set to 500 µm. In addition, the water content of the cake is from 14.7 to 16.7% when the separation particle diameter is set to 350 µm, the water content of the cake is from 15 to 17% when the separation particle diameter is set to 250 µm, the water content of the cake is from 15.3 to 17.3% when the separation particle diameter is set to 200 µm, the water content of the cake is from 15.8 to 17.8% when the separation particle diameter is set to 150 µm, the water content of the cake is from 16.3 to 18.3% when the separation particle diameter is set to 100 µm, and the water content of the cake is from 17 to 19% when the separation particle diameter is set to 60 µm. FIG. 5 illustrates the relationship between the separation particle diameter set when collecting iron powder-containing dust B, and the water content of the cake formed. It is seen from FIG. 5 that a marked difference is produced in the water content of the cake between when the separation particle diameter of the coarse particle separator 12 is set to 150 µm or more and when set to less than 150

μm. Accordingly, when the separation particle diameter is set to a range of, for example, from 150 to 500 μm, the filling factor of the cake is enhanced, and the water content of the cake decreases, so that the drying time and drying cost of the crushed product can be reduced.

Figure 6:
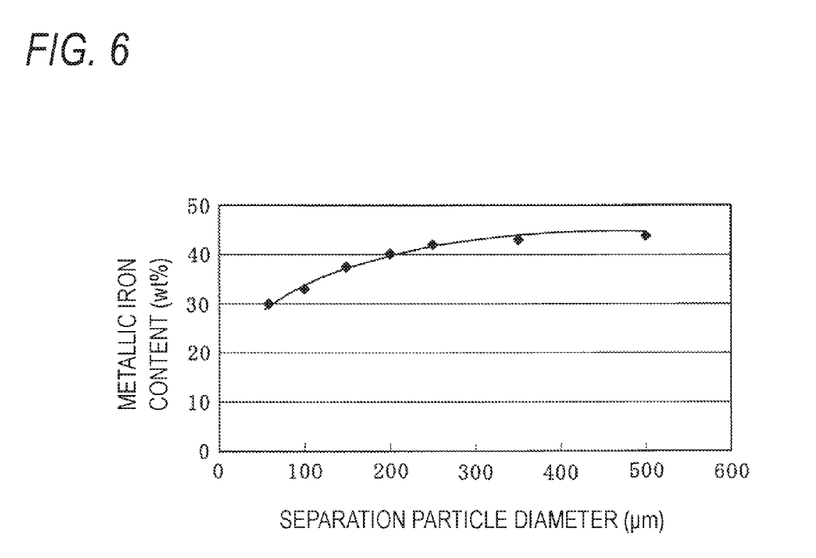
FIG. 6 is a graph illustrating the relationship between the separation particle diameter set when collecting iron powder-containing dust B forming the crushed product, and the metallic iron content percentage of the crushed product formed of the iron powder-containing dust B.

In addition, when the content percentage of metallic iron contained in the crushed product of a cake formed using a mixed slurry produced from a slurry containing iron powder-containing dust B collected while setting the separation particle diameter of the coarse particle separator 12 to 500, 350, 250, 200, 150, 100 and 60 μm is measured, the content percentage is from 41 to 47 mass % at a separation particle diameter of 500 μm, from 40 to 46 mass % at a separation particle diameter of 350 μm, from 39 to 45 mass % at a separation particle diameter of 250 μm, from 37 to 43 mass % at a separation particle diameter of 200 μm, from 34 to 40 mass % at a separation particle diameter of 150 μm, from 30 to 37 mass % at a separation particle diameter of 100 μm, and from 27 to 33 mass % at a separation particle diameter of 60 μm. FIG. 6 illustrates the relationship between the separation particle diameter set when collecting iron powder-containing dust B forming the crushed product, and the metallic iron content percentage of the crushed product formed of the iron powder-containing dust B. Accordingly, when the separation particle diameter is set to a range of, for example, from 150 to 500 μm, the content of metallic iron contained in iron powder-containing dust B can be increased, and the iron powder-containing dust can be further effectively utilized as a metallic iron resource.

Here, if the weight of quick lime added is less than 3% relative to the weight of the iron powder-containing dust B, for example, if the amount of quick lime added is 2.5%, a problem of strength deficiency (the solidification is insufficient) arises. On the other hand, if the amount of quick lime added exceeds 15%, sufficient strength may be developed in the crushed product, but a "lump" is formed in the mixing tank 15, and there arises a problem that a homogeneous slurry cannot be produced. For this reason, the amount of quick lime added is set to a range of 3 to 15% relative to the weight of iron powder-containing dust B. In this connection, when the amount of quick time added is from 3 to 15%, the drying period required until strength is developed in the crushed product is, for example, from 6 to 12 hours.

Further, if the weight of cement added is less than 15% relative to the weight of the iron powder-containing dust B, for example, if the amount of cement added is 10%, a problem of strength deficiency (the solidification is insufficient) may arise. On the other hand, if the amount of cement added exceeds 20%, sufficient strength may be developed in the crushed product, but a "lump" may be formed in the mixing tank 15, and there may arise a problem that a homogeneous slurry cannot be produced. For this reason, the amount of cement added is set to a range of 15 to 20%, relative to the weight of iron powder-containing dust B. Accordingly, when the amount of cement added is from 15 to 20%, the drying period required until strength is developed in the crushed product is, for example, from 5 to 8 days.

Fifth Step

After the completion of compression, the cake is discharged from the filter press 17 onto the belt conveyer 18 arranged below the filter press 17. The cake is then supplied to the crusher 19 by the belt conveyer 18 and subjected to sizing to a preset size, for example, a one-side length of 30 to 60 mm and a thickness of 30 min, to produce a crushed product.

Sixth Step

The crushed product is classified by a set classification size, for example, 3 mm and 10 mm, by using the classifier 20, and a crushed product of a classification size of 10 mm or more is recovered as a crushed product and supplied to the drying hopper 21. A small-size crushed product generated during sizing, i.e., a crushed product of a classification size of 3 mm or less, is separated and reused by returning it to the mixing tank 15 or discarded. A crushed product of a classification size of 3 to 10 mm is separated, conveyed differently to the delivery vessel 23, and stocked together with a crushed product dried in the drying hopper 21.

Seventh Step

The crushed product is charged into the top of the drying hopper 21 by using a belt conveyer 37 and dried, and the crushed product after drying is discharged from the bottom of the drying hopper 21 through the belt feeder 22, conveyed to the delivery vessel 23 by a belt conveyer 43, once stocked, then conveyed to the underground bunker 25 of a converter shop by the truck 24, and accumulated. The crushed product in the underground bunker 25 is charged into the converter by way of the on-furnace bunker 27 according to the converter operation. Here, the crushed product accumulated is kept at a temperature of less than 90° C. by passing air into the underground bunker 25.

As described above, a mixed slurry is produced from a slurry containing iron powder-containing dust B having a particle diameter of not more than the separation particle diameter set to a range of 60 to 500 μm, and a crushed product of a cake formed by filter-pressing the mixed slurry is dried and immediately accumulated in the underground bunker 25, so that the time required after the iron powder-containing dust B is collected until a crushed product of the iron powder-containing dust B is accumulated in the underground bunker 25 can be shortened. As a result, the metallic iron contained in the iron powder-containing dust B can be kept from oxidation during processing of the iron powder-containing dust B, and the metallic iron content in the crushed product accumulated in the underground bunker 25 can be increased.

The metallic iron in the crushed product during storage in the underground bunker 25 is oxidized by oxygen in air and although oxidation heat is generated at the time, air is forcibly passed into the underground bunker 25, so that the oxidation heat can be dissipated and a rise in the temperature of the crushed product during storage can be prevented. As a result, oxidation of the crushed product can be suppressed. Here, installation of a cooling system capable of sounding an alarm when the temperature of the crushed product in the underground bunker 25 reaches, for example, 60° C., issuing an emergency alarm when the temperature is thereafter elevated to 80° C., and cooling the crushed product by increasing the amount of air passed, makes it possible to prevent a rise in the temperature of the crushed product and lower the temperature of the crushed product to 80° C. or less. In turn, the crushed product accumulated in the underground bunker 25 can be stored in the state of high metallic iron content until it is charged into the converter.

When the crushed product is charged into the converter furnace, molten iron produced in a blast furnace and subjected to a pretreatment processing as needed may be charged together.

In the case where cement is added as a binder in the third step above, it is preferable that the content of sulfur in molten iron to be charged into the converter furnace with the crushed product may be preliminarily reduced to 0.006% or less relative to the weight of the molten iron.

Typically, the sulfur component contained in cement, which as an impurity component may deteriorate properties of steel materials, is in about 1%. Molten iron may contain a small amount of sulfur. Ordinarily, during decarburization processing in the converter surface, the composition of a slag is adjusted by making desulfurization reaction occurred in which sulfur is transferred to the slag, so that the content of sulfur becomes less than such an amount deteriorating properties of steel materials. However, in some case where cement is added as binder, there is a possibility that the total amount of sulfur charged into the converter furnace exceed the limit which can be sufficiently reduced through desulfurization by adjusting the composition of the slag. Accordingly, it is preferable that the content of sulfur in molten is preliminary reduced to 0.006% or less relative to the weight of the molten iron.

In another embodiment of the present invention, a method for manufacturing steel includes: producing molten iron in a blast furnace; charging the molten iron into a converter furnace with iron powder-containing dust generated at the time of converter blowing and subjected to a recycling processing, and decarburizing the molten iron in the converter furnace to produce steel. Here, as the recycling processing, the method for recycling processing of dust generated in a converter furnace according to one embodiment of the present invention as explained above may be adopted.

EXAMPLES

Example 1

Iron powder-containing dust generated at the time of converter blowing was wet-collected using a wet dust collector, the wet-collected iron powder-containing dust was supplied to a coarse particle separator set to a separation particle diameter of 200 μm, iron powder-containing dust A having a particle diameter of more than 200 μm was separated, and iron powder-containing dust B having a particle diameter of 200 μm or less was collected. Subsequently, iron powder-containing dust B was conveyed as supernatant water to a precipitation tank and after forming an aggregate of iron powder-containing dust B by adding a polymer flocculant, the obtained aggregate of iron powder-containing dust B was conveyed as a slurry together with water to a stock tank and accumulated in a stirring state. Thereafter, the slurry was conveyed from the stock tank to a mixing tank, and quick lime in an amount of 5% relative to the weight of iron powder-containing dust B contained in the slurry was supplied and mixed to produce a mixed slurry. The specific gravity of the slurry was 1.28, and the viscosity was 0.65 dPa·s. The viscosity of the slurry was measured by means of a rotary viscometer (Viscotester, manufactured by RION Co., Ltd.). The specific gravity of the slurry was determined by putting the slurry in a 500-cc beaker and measuring the weight by an electronic balance. The mixed slurry in the mixing tank was then supplied to a filter press through mixed slurry supply means and compressed to form a plate-like cake having a length of 1,100 mm, a width of 1,100 mm and a thickness of 30 mm. The obtained cake was crushed to prepare a crushed product, and when the drying period until development of strength in a crushed product of 10 mm or more was determined, the drying time was about 12 hours.

Example 2

As in the same manner as in Example 1, the slurry was conveyed from the stock tank to the mixing tank, cement was added in a ratio of 5, 10 and 15% relative to the weight of iron powder-containing dust B contained in the slurry to produce a mixed slurry, a cake was formed using the filter press, and a crushed product was prepared. The drying period until development of strength in a crushed product of 10 mm or more was determined, as a result, strength was not developed when the amount of cement added is 5 and 10%, and in the case where the amount of cement added was 15%, strength was developed, but the drying period required 5 days. As for the cost ratio of the binder, cement was about 3 times when quick lime is 1.

In this way, it could be confirmed that use of quick lime as the binder is advantageous in view of reduction of binder cost, shortening of drying period (curing period), and enhancement of productivity, compared with use of cement.

Example 3

Each of the crushed products prepared in Examples 1 and 2 was put in a vessel (a bottomed cylindrical body having an inner diameter of 800 mm and a length of 2,000 mm) and after performing a spontaneous combustion test of the crushed product, a temperature simulation model of the crushed product was constructed from the test results regarding spontaneous combustion. The temperature of the underground bunker at the time of oxidation of the crushed product during storage in the underground bunker was estimated using the temperature simulation model and found to reach 90° C. It could not be confirmed by calculation that the crushed product spontaneously combusts to reach a temperature in excess of 100° C., but the estimation that the temperature of the crushed product reaches 90° C. suggests a good possibility of causing spontaneous combustion in the crushed product depending on the conditions. Accordingly, when stored such that the temperature of the crushed product during storage in the underground bunker is less than 90° C., for example, 80° C. or less, the crushed product during storage in the underground bunker can be prevented from spontaneous combustion.

Then, the extent to which the insulation structure of vessel and the forced air passing affect the heat balance (heat generation and heat dissipation) was quantitatively evaluated, and the insulation structure conditions and forced air passing conditions, capable of maintaining the crushed product during storage at a temperature of 50° C., were determined. The determined conditions were applied to the temperature simulation model of the crushed product, and it could be confirmed that the temperature of the crushed product is 80° C. when air is not forcibly passed into the crushed product during storage in the underground bunker but the temperature of the crushed product can be maintained at 64° C. and 45° C. when air is forcibly passed at 200 m³/hour and 1,000 m³/hour, respectively (provided that the outside air temperature is 10° C.). Here, the temperature of the crushed product was measured by inserting TC (thermocouple) into the vessel containing the crushed product and measuring the atmosphere temperature in the crushed product filling layer.

In the foregoing pages, the present invention has been described by referring to an embodiment, but the present invention is not limited to the configuration of the embodiment described above and includes other embodiments or modification examples contemplated within the scope of matters set forth in the claims.

Furthermore, the constituents contained in each of the embodiment above and other embodiments or modification examples may be combined, and this is also included in the present invention.

For example, in the case of forcibly passing air into the underground bunker, the amount of air passed into the underground bunker may be increased when the temperature of the crushed product in the underground bunker is elevated (for example, when reaches 60° C.). By this configuration, a temperature rise of the crushed product can be restrained at an early stage, and the temperature of the crushed product can be kept at 60° C. or less.

In addition, the periphery of the discharge port of the underground bunker may be covered with a cover, a nitrogen gas may be supplied (sealing with nitrogen gas) into the cover, and when the temperature of the crushed product in the underground bunker is elevated, the nitrogen gas may be caused to flow into the underground bunker from the discharge port by the draft effect. By this configuration, the oxygen concentration in the underground bunker can be rapidly reduced, and oxidation of metallic iron in the crushed product can be suppressed, so that the temperature of the crushed product can be kept at 60° C. or less.

Furthermore, in the embodiment above, the dried crushed product is accumulated in the underground bunker and charged into the converter by way of the on-furnace bunker according to the converter operation, but it is also possible that an accumulation tank for crushed product is disposed in a converter shop, for example, in a scrap yard and the crushed product is accumulated while forcibly passing air into the accumulation tank and is charged into the converter by way of a scrap shoot according to the converter operation. Here, a partition wall (where an opening for passing air and an opening for importing and exporting the crushed product are formed) for isolating a part of the scrap yard from the surroundings may be provided to make up an accumulation tank.

In the embodiment above, a drying hopper is used for drying the crushed product, but it is also possible that while conveying the crushed product on a mesh belt conveyer, the crushed product is dried by blowing hot air from above or below the belt conveyer or blowing hot air alternately from above and below the belt conveyer (ventilation band drying method). Furthermore, the crushed product may be dried also by loading the crushed product on a carriage and passing the carriage through a tunnel kiln (tunnel kiln method).

INDUSTRIAL APPLICABILITY

According to the present invention, there is provided a method for recycling processing of dust generated in a converter furnace, where iron powder-containing dust generated at the time of converter blowing can be collected at a low cost in a short time and returned as a metallic iron resource to the converter process.

While the present invention has been described in detail and with reference to specific embodiments thereof, it will be apparent to one skilled in the art that various changes and modifications can be made therein without departing from the spirit and scope of the present invention.

DESCRIPTION OF REFERENCE NUMERALS AND SIGNS

10: Converter, 11: wet dust collector, 12: coarse particle separator, 13: precipitation tank, 14: stock tank, 15: mixing tank, 16: binder stock tank, 17: filter press, 18: belt conveyer, 19: crusher, 20: sieve, 21: drying hopper, 22: belt feeder, 23: delivery vessel, 24: truck, 25: underground bunker, 26: belt conveyer, 27: on-furnace bunker, 28: screw feeder, 29: collection tank, 30: suction pump, 31: high-pressure forcing pump, 32: mixed slurry supply means, 37: bent conveyer, and 43: bent conveyer.

The invention claimed is:

1. A method for recycling iron powder-containing dust generated in a converter furnace at a time of converter blowing, comprising: wet collecting the dust and adding a binder to prepare a slurry, supplying the slurry to a dehydration treatment in a filter press to form a cake, crushing and drying the cake to produce a crushed product, accumulating the crushed product in an accumulation tank, and charging the crushed product back into the converter furnace, the method further comprising forcibly passing cooling air into the accumulation tank to reduce a temperature of the crushed product in the accumulation tank based on suppression of heat generated by the crushed product.

2. The method for recycling iron powder-containing dust generated in a converter furnace according to claim 1, wherein the slurry comprises iron powder-containing dust B as a remainder after separating iron powder-containing dust A exceeding a set separation particle diameter from the wet-collected iron powder-containing dust.

3. The method for recycling iron powder-containing dust generated in a converter furnace according to claim 2, wherein the separation particle diameter is set to a range of 60 to 500 μm.

4. The method for recycling iron powder-containing dust generated in a converter furnace according to claim 2, wherein quick lime is added as the binder in an amount of 3 to 15% relative to a weight of the iron powder-containing dust B in the slurry.

5. The method for recycling iron powder-containing dust generated in a converter furnace according to claim 3, wherein quick lime is added as the binder in an amount of 3 to 15% relative to a weight of the iron powder-containing dust B in the slurry.

6. The method for recycling iron powder-containing dust generated in a converter furnace according to claim 4, wherein the slurry has a specific gravity of 1.2 to 1.35 and a viscosity of 0.2 to 1 dPa·s.

7. The method for recycling iron powder-containing dust generated in a converter furnace according to claim 2, wherein the slurry has a specific gravity of 1.2 to 1.35 and a viscosity of 0.2 to 1 dPa·s.

8. The method for recycling iron powder-containing dust generated in a converter furnace according to claim 2, wherein cement is added as the binder in an amount of 15 to 20% relative to a weight of the iron powder-containing dust B in the slurry.

9. The method for recycling iron powder-containing dust generated in a converter furnace according to claim 1, wherein the slurry has a specific gravity of 1.2 to 1.35 and a viscosity of 0.2 to 1 dPa·s.

10. The method for recycling iron powder-containing dust generated in a converter furnace according to claim 1, further comprising: producing molten iron in a blast furnace; charging the molten iron into the converter furnace with crushed product; and decarburizing the molten iron in the converter furnace to produce steel.

11. The method for recycling iron powder-containing dust generated in a converter furnace according to claim 10, wherein the slurry comprises iron powder-containing dust B as a remainder after separating iron powder-containing dust A exceeding a set separation particle diameter from the wet-collected iron powder-containing dust.

12. The method for recycling iron powder-containing dust generated in a converter furnace according to claim 11, wherein cement is added as the binder in an amount to 15 to 20% relative to a weight of the iron powder-containing dust B in the slurry.

13. The method for recycling iron powder-containing dust generated in a converter furnace according to claim 12, further comprising reducing a sulfur content in the molten iron to 0.006% or less relative to a weight of the molten iron produced in the blast furnace before the molten iron is charged into the converter furnace with the crushed product.

14. The method for recycling iron powder-containing dust generated in a converter furnace according to claim 1, wherein the temperature of the crushed product is kept at a temperature of less than 90° C.

15. The method for recycling iron powder-containing dust generated in a converter furnace according to claim 1, wherein the temperature of the crushed product is kept at a temperature of less than 80° C.

16. The method for recycling iron powder-containing dust generated in a converter furnace according to claim 1, wherein the temperature of the crushed product is kept at a temperature of less than 60° C.

17. A method for manufacturing steel, comprising:
producing molten iron in a blast furnace;
charging the molten iron into a converter furnace with iron powder-containing dust generated at a time of converter blowing and subjected to recycling processing; and
decarburizing the molten iron in the converter furnace to produce steel;
wherein the recycling processing comprising: wet collecting the dust and adding a binder to prepare a slurry, supplying the slurry to a dehydration treatment in a filter press to form a cake, crushing and drying the cake to produce a crushed product, accumulating the crushed product in an accumulation tank, and charging the crushed product back into the converter furnace, the method further comprising forcibly passing cooling air into the accumulation tank to reduce a temperature of the crushed product in the accumulation tank based on suppression of heat generated by the crushed product.

18. The method for manufacturing steel according to claim 17, wherein the slurry comprises iron powder-containing dust B as a remainder after separating iron powder-containing dust A exceeding a set separation particle diameter from the wet-collected iron powder-containing dust.

19. The method for manufacturing steel according to claim 18, wherein quick lime is added as the binder in an amount of 3 to 15% relative to a weight of the iron powder-containing dust B in the slurry.

20. The method for manufacturing steel according to claim 18, wherein cement is added as the binder in an amount to 15 to 20% relative to a weight of the iron powder-containing dust B in the slurry.

21. The method for manufacturing steel according to claim 20, further comprising reducing a sulfur content in the molten iron to 0.006% or less relative to a weight of the molten iron before the molten iron is charged into the converter furnace with the iron powder-containing dust.

22. The method for manufacturing steel according to claim 17, wherein the separation particle diameter is set to a range of 60 to 500 μm.

23. The method for manufacturing steel according to claim 17, wherein the slurry has a specific gravity of 1.2 to 1.35 and a viscosity of 0.2 to 1 dPa·s.

\* \* \* \* \*